United States Patent [19]
Buckreub

[11] Patent Number: 5,590,044
[45] Date of Patent: Dec. 31, 1996

[54] METHOD AND APPARATUS FOR FINDING AIRCRAFT POSITION BY INTEGRATING ACCELERATIONS LESS TIME AVERAGES

[75] Inventor: Stefan Buckreub, Munich, Germany

[73] Assignee: Deutsche Forschungsanstalt für Luft- und Raumfahrt e.V., Köln, Germany

[21] Appl. No.: 382,532

[22] Filed: Feb. 2, 1995

[30] Foreign Application Priority Data

Feb. 2, 1994 [DE] Germany ............... 44 03 190.4

[51] Int. Cl.$^6$ ............... G01S 13/90; G06F 17/10
[52] U.S. Cl. ............... 364/453; 364/456; 364/460; 364/449; 342/25; 342/195; 342/357
[58] Field of Search ............... 364/453, 449, 364/460, 456, 434, 447, 454, 571.01, 571.02; 342/451, 195, 357, 462, 25, 62, 95, 113, 191; 340/991, 992, 993; 244/3.2, 175

[56] References Cited

U.S. PATENT DOCUMENTS

| | | | |
|---|---|---|---|
| 3,702,477 | 11/1972 | Brown | 342/451 |
| 5,166,688 | 11/1992 | Moreira | 342/25 |
| 5,193,064 | 3/1993 | Maki | 364/454 |
| 5,216,611 | 6/1993 | McElreath | 364/454 |
| 5,327,140 | 7/1994 | Buckreuss | 342/25 |

FOREIGN PATENT DOCUMENTS 4027393  8/1990  Germany.

OTHER PUBLICATIONS

Tienmeyer, B., *Precision Navigation with an Integrated Navigation System*, Journal Of Flight Sciences And Space Research, vol. 16, No. 4, pp. 257–262, Aug. 1992.

*Primary Examiner*—Kevin J. Teska
*Assistant Examiner*—Tan Nguyen
*Attorney, Agent, or Firm*—Browdy and Neimark

[57] ABSTRACT

A method and apparatus for short-range position determination of aircraft, used for preventing errors in radar mapping from position inaccuracies, finds velocity in the x-direction (flight direction) by integrating accelerometer outputs. The accelerometer values are averaged over a time interval and then the average is subtracted from the instantaneous signal value; this difference, called adjusted acceleration, is integrated over time to yield a velocity. In turn, this velocity is time-averaged and the time average is subtracted from the instantaneous velocity. The resulting adjustment velocity is subtracted from the output of aircraft speedometer, and the difference is used to generate estimates of the average aircraft speed and acceleration by the method of least squares. These estimates are used to create a speed correction term for correcting the flight speed. The same process is used for positions in the y-direction and z-direction (vertical), except that an additional integration, time-average, and subtraction are involved for each.

4 Claims, 8 Drawing Sheets

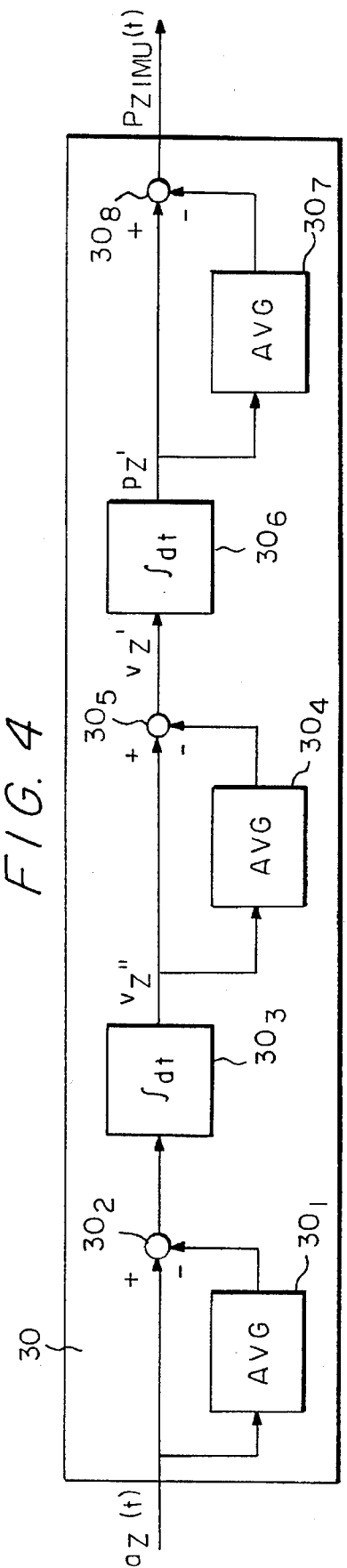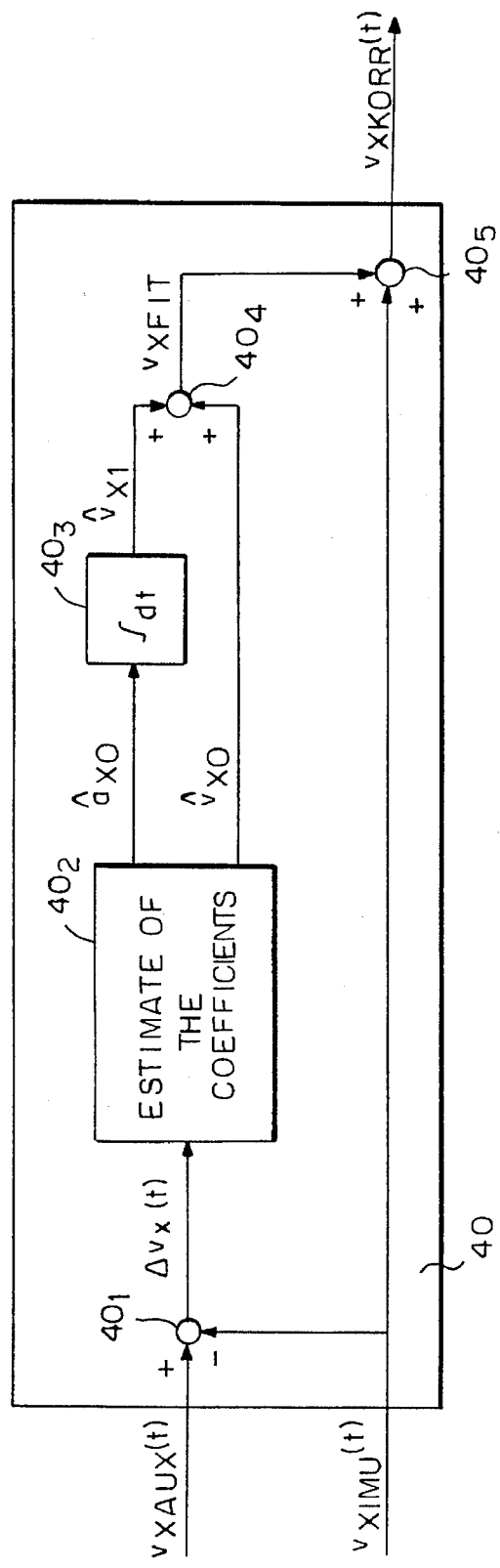
FIG. 4
FIG. 5

METHOD AND APPARATUS FOR FINDING AIRCRAFT POSITION BY INTEGRATING ACCELERATIONS LESS TIME AVERAGES

The invention relates to a method for determining the position of an aircraft from acceleration data of an inertial system as well as from the output data of a navigation system, and to a device for executing the method.

An airborne radar system with a Synthetic aperture (SAR), operated by Applicant, operates in the L, C and X bands. Such radar systems are used for imaging the surface of the earth along the path of flight. In this case the antenna is aligned vertically to the direction of flight and slanted downward, as schematically represented in FIG. 9. A map is obtained as the result, whose image points represent the radar reflectivity of the objects on the ground.

Ideal flight conditions are generally required when processing a radar image, i.e. heading, position and forward speed are assumed to be constant. However, this is not the fact in actuality, because the aircraft is deflected by turbulence from its nominal flight path and its forward speed also varies. Deviations from the flight level and laterally in respect to the direction of flight result in variations of the slant range between the antenna and an illuminated target on the ground and therefore have an effect on the phase history of a backscattered signal. The equidistant scanning of the illuminated strip of terrain is also prevented by the variance in forward speed. In addition, the motion errors impair the azimuth compression and lead to a degratation of the quality of the processed radar images, which results in geometric distortions, degratation the resolution and reduction of the contrast.

Various methods are known for motion compensation. In a motion compensation system using a master/slave system, two inertial navigation systems (INS) are employed, wherein the slave system is mounted in the vicinity of the antenna and the master system usually in the aircraft nose. The slave system is used for measurements stable over a short time, while measurements stable over a long time are performed by means of the master system; subsequently both measurements are then linked via a so-called Kalman filter.

The disadvantage in motion compensation by means of a master-slave system is that the slave system is simply designed and, as already mentioned, can only be used for short time measurements. With long time measurements, sensor errors cause a drift in the position calculations. Therefore the slave system must be supported by a master system stable over a long time which, however, normally is a part of an aircraft navigation system and is located in the nose of the aircraft, as mentioned above.

This normally results in a long lever arm between the INS system and the antenna phase center, which must be compensated by calculation. Extremely high demands on the angle resolution capabilities of the inertial sensor result with a very long lever arm, which cannot be maintained by any INS system. Therefore the master INS system can only be used with limited accuracy for motion compensation; at the same time the computation of the Kalman filters for supporting the slave INS system is very elaborate and requires an additional correspondingly large use of software and hardware. Furthermore, when employing a Kalman filter, an accurate tuning to the error characteristics of the master and slave systems used is necessary.

The employment of global positioning systems (GPS systems) for motion compensation allows an accurate determination of the position and speed. A differential GPS system in particular is generally suited for motion compensation. However, the exclusive employment of GPS systems permits only the compensation of low-frequency errors. Presently available GPS receivers supply a position at a data rate of approximately 2 Hz, wherein a maximum band width of 1 Hz can be inferred because of the Nyquist criterion. However, for the motion compensation of SAR systems, such as E-SAR, the detection of movement errors up to 3 Hz is required for generating high-quality SAR images. If a slave INS system is linked with a Kalman filter, the exact tuning to the error characteristics of the master GPS receiver and the slave INS system used is also required.

In an autofocus method for motion compensation, raw radar data are evaluated and are normally only used for the estimation of the forward speed of the carrier. However, the autofocus method requires a very large compensation effort and with real time systems therefore makes great demands on the hardware. Furthermore, the band width and accuracy in the autofocus system are not very great and with greater calculation errors the compensation of the speed error alone is not sufficient to generate a good image quality.

With a motion compensation by means of the so-called refelctivity displacement method, the azimuth spectrum of the raw radar data is evaluated; by means of this it is possible to determine the forward speed and a phase error. The motion compensation is subsequently performed by means of this information. A large calculating effort is also necessary with the reflectivity displacement method. Therefore, in real time this method can only be realized with parallel operating computers. The band, width is limited in addition, and with more extensive interference movements the separation of the speed and the deviation information represents problems. The realization of a master/slave system is not possible because of the high-pass characteristics of the detected deviation, since no information regarding long-term motion errors is available.

An improvement in the image quality can be achieved by the correction of phase errors and by the readjustment of the pulse repetition frequency. A method and a device are described in patent application P 42 25 413.2 of Applicant for calculating the above described motion errors and required correction parameters from the measuring data of an inertial attitude and heading reference system, also referred to hereinafter as an IMU (inertial measurement unit) system. A correction/of the motion errors is possible with this method; however, the method has system errors which in actual use—under normal conditions—are not of particular importance. However, in connection with the most stringent demands, in particular on the geometric fidelity of an SAR image, these errors must be taken into account.

It is therefore the object of the invention to produce a method for determining the position of an aircraft as well as a device for executing the method, by means of which it is possible with the employment of an additional motion sensor, such as a barometer or radar altimeter, or an additional navigation system such as GPS, or a Doppler radar, to perform an estimation of the errors occurring in connection with the method in accordance with P 42 25 413.2, as well as their compensation.

In accordance with the invention this is attained, in a method for determining the position of an aircraft from acceleration data of an inertial system as well as output data of a navigation system, by the characteristics of claim 1. This is furthermore attained in connection with a device for executing the method by the characteristics of claim 2.

In accordance with the invention, to perform a motion compensation the output data of an attitude and heading reference system are used, which is installed as closely as possible to the phase center of a receiving antenna. As is customary with inertial systems, the reference system is supplied with magnetic heading, true airspeed, barometric and DME/VOR (distance measuring equipment/VHF omnidirectional radio range) data. By means of this it is then possible to calculate the required navigational data with a high degree of accuracy. In contrast thereto, with the method in accordance with patent application P 42 25 413.2 an accurate motion compensation is only possible under normal conditions, as already mentioned.

The set-up of a master/slave system—without using a Kalman filter—is possible with the method of the invention, wherein the attitude and heading reference system is employed as the slave system. The GPS systems, as well as an inertial navigation system, is mainly considered as the master system. To support the forward speed, it is also possible to use the so-called reflectivity offset method in accordance with German Patent Publication DE 39 22 438, or a Doppler radar or other velocity sensor. The flight level can furthermore be supported by barometer or altimeter measurements.

The method of the invention has a high degree of ruggedness and permits the support of the output of the slave system even when individual data of the master system are lacking. In this case the method of the invention can continue to be employed without changes if another master system is used. The simultaneous employment of different master systems for the three main directions, i.e. X-, Y- and Z-direction of the flight movement is also possible without any changes. In addition it is possible with the method of the invention to operate with rapid algorithms, and a device for executing the method of the invention can be realized in a cost-effective manner with a small outlay of software and hardware.

The invention will be explained in detail below by means of a preferred embodiment, making reference to the attached drawings.

FIG. 4 is a schematic detailed block diagram of a device for calculating the erroneous vertical deviation as detected by a slave system;

FIG. 5 is a schematic detailed block diagram of a device augmenting the forward speed determined by means of an inertial system by an additional speed measurement;

Figure 8A:
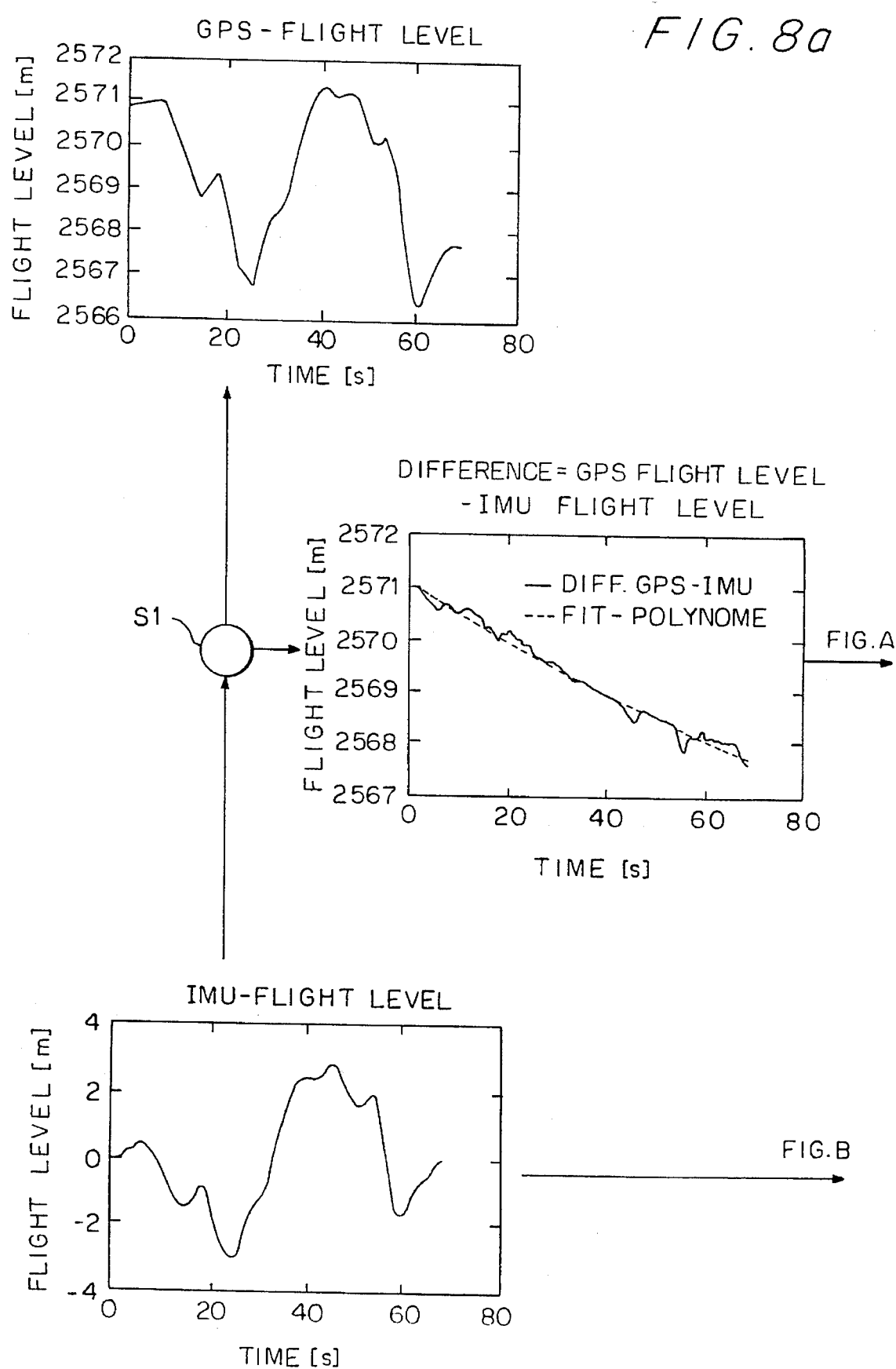
Figure 8B:
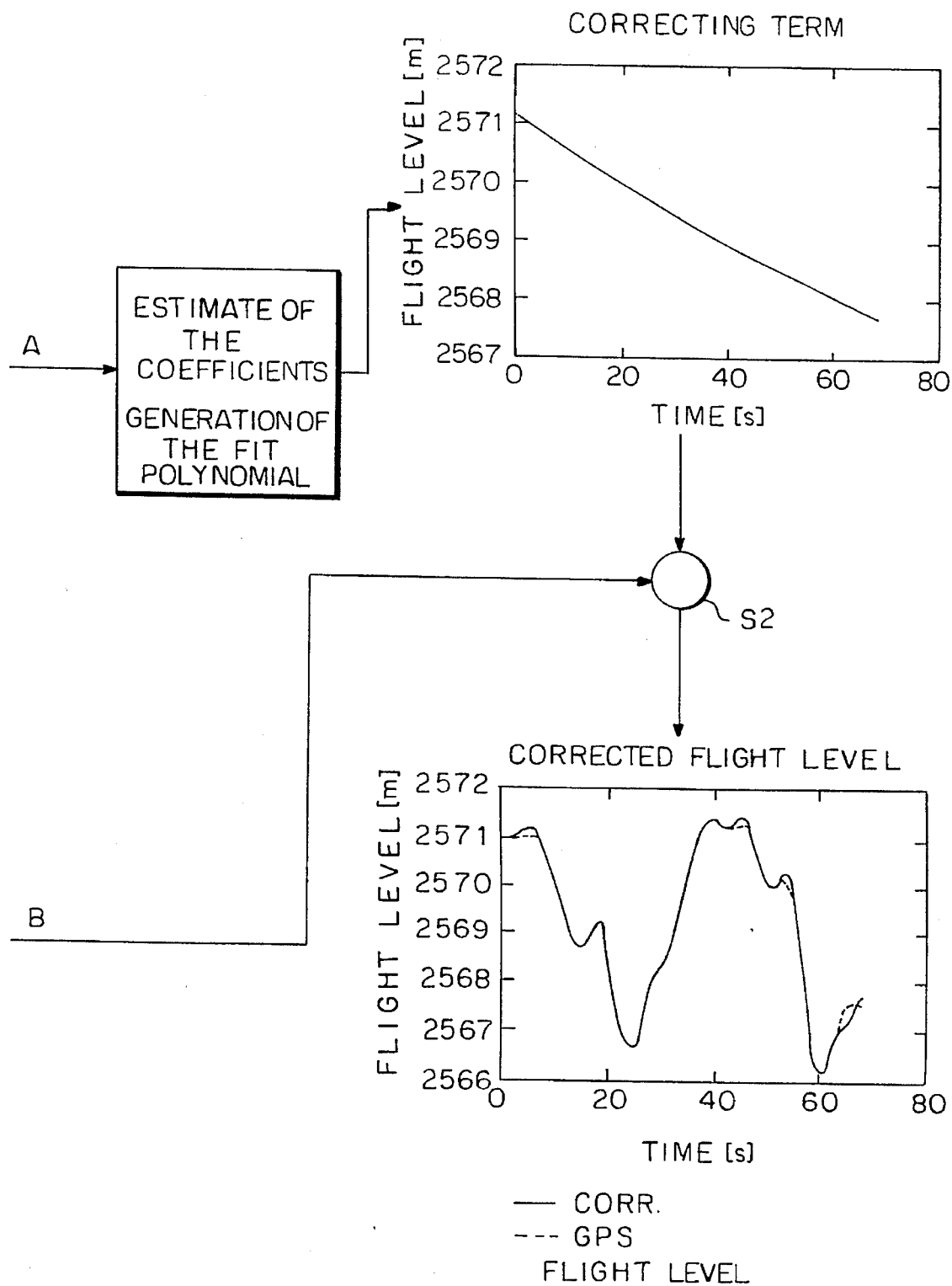
Figure 9:
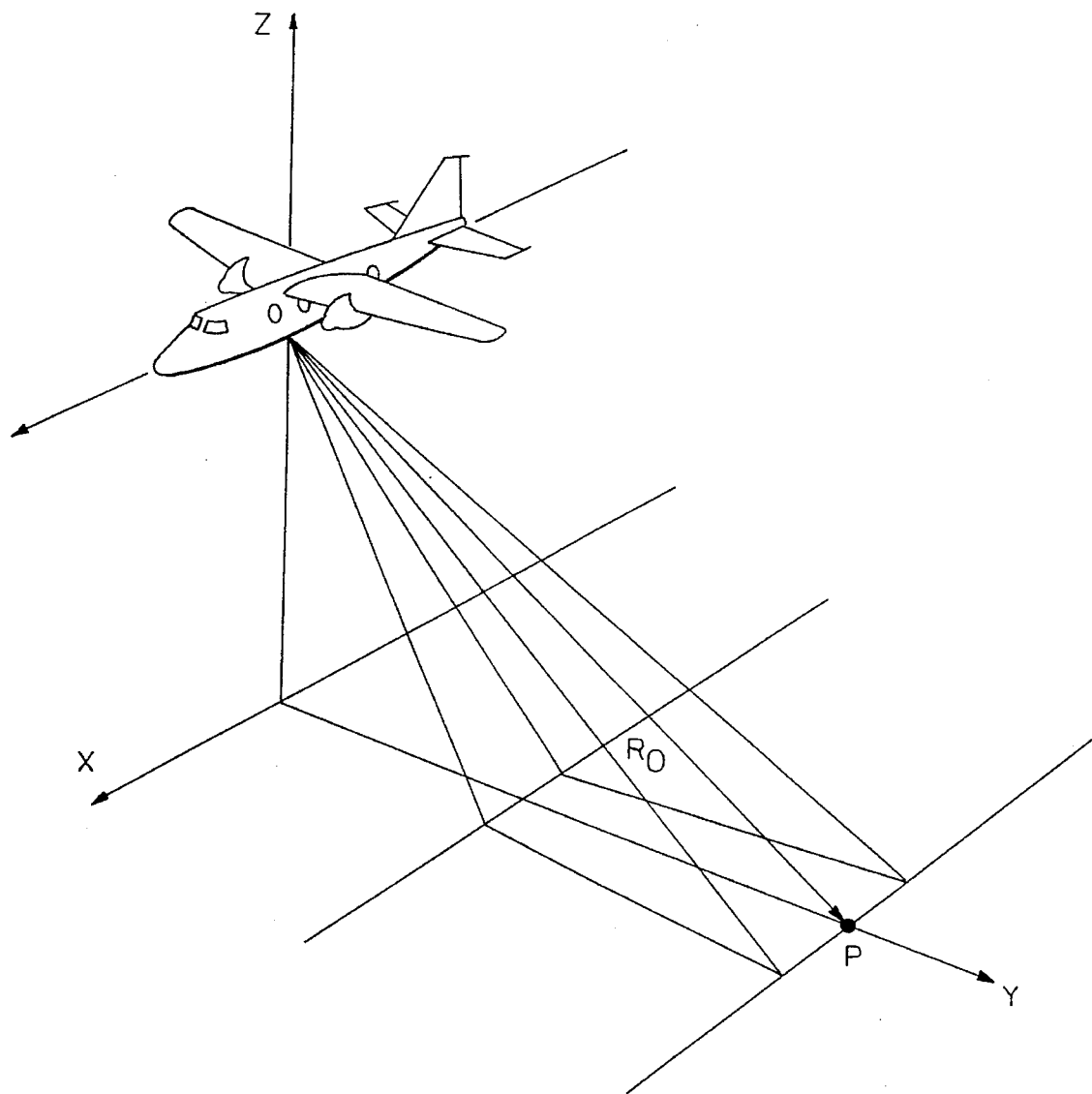

FIGS. 8a and 8b provide a schematic representation of an example for generating a corrected flight level by means of IMU and GPS data; and FIG. 9 is a schematic representation of an SAR flight geometry.

The following symbols and their meaning are used in the above drawing figures as well as in the subsequent description:

$a_X(t)$ Acceleration in the direction of flight (along track acceleration)

$a_Y(t)$ Acceleration transversely to the direction of flight (across track acceleration)

Figure 1:
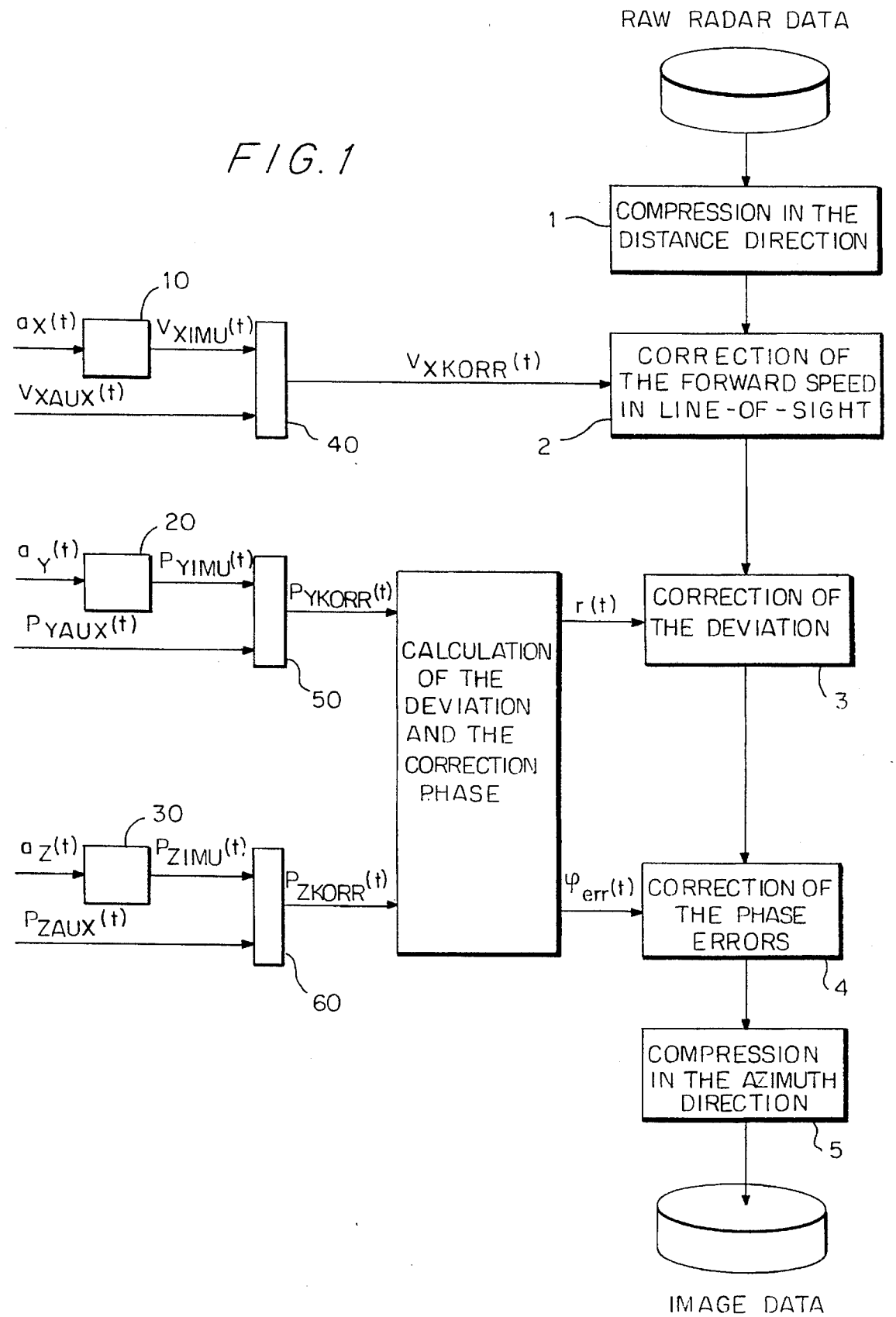
FIG. 1 is a schematic block diagram of the basic progression of SAR data processing with compensation of motion errors.

$a_Z(t)$ Vertical acceleration $a_{X0}(t)$ Constant acceleration in the direction of flight $a_{Y0}(t)$ Constant acceleration transversely to the direction of flight $a_{Z0}(t)$ Constant vertical acceleration $\hat{a}_{X0}$ Estimated constant acceleration in the direction of flight $\hat{a}_{Y0}$ Estimated constant acceleration transversely to the direction of flight $\hat{a}_{Z0}$ Estimated constant vertical acceleration $p_{Y0}$ Constant deviation parallel to the direction of flight $p_{Z0}$ Constant flight level above the ground $\hat{p}_{Y0}$ Estimated constant deviation parallel to the direction of flight $\hat{p}_{Z0}$ Estimated constant flight level above the ground $p_{YAUX}(t)$ Measurement by a master system of the lateral deviation $p_{ZAUX}(t)$ Measurement by a master system of the flight level above the ground $p_{YERR}(t)$ Error of the lateral deviation $p_{ZERR}(t)$ Error of the flight level above the ground $p_{YFIT}(t)$ Term for correcting the lateral deviation $p_{ZFIT}(t)$ Term for correcting the flight level above the ground $p_{YIMU}(t)$ Lateral deviation of the slave system $p_{ZIMU}(t)$ Flight level of the slave system $p_{YKORR}(t)$ Corrected lateral deviation $p_{ZKORR}(t)$ Corrected flight level above the ground $p_{YN}(t)$ Noise of the correcting term of the lateral deviation $p_{ZN}(t)$ Noise of the correcting term of the flight level above the ground $v_{X0}$ Constant speed in the direction of flight $v_{Y0}$ Constant speed transversely to the direction of flight $v_{Z0}$ Constant vertical speed $\hat{v}_{X0}$ Estimated constant speed in the direction of flight $\hat{v}_{Y0}$ Estimated constant speed transversely to the direction of flight $\hat{v}_{Z0}$ Estimated constant vertical speed $v_{XAUX}(t)$ Forward speed measured by a master system $v_{XERR}(t)$ Error of the forward speed $v_{XFIT}(t)$ Term for correcting the forward speed $v_{XIMU}(t)$ Forward speed of the slave system $v_{XKORR}(t)$ Corrected forward speed $v_{ZN}(t)$ Noise of the correcting term of the forward speed $\hat{p}_{Y1}(t)$ Estimated linear progression of the deviation transversely to the direction of flight $\hat{p}_{Y2}(t)$ Estimated quadratic progression of the deviation transversely to the direction of flight $\hat{p}_{Z1}(t)$ Estimated linear progression of the flight level $\hat{p}_{Z2}(t)$ Estimated quadratic progression of the flight level $\hat{v}_{X1}(t)$ Estimated linear progression of the speed in the direction of flight $\hat{v}_{Y1}(t)$ Estimated linear progression of the speed transversely to the direction of flight $\hat{v}_{Y2}(t)$ Estimated quadratic progression of the speed transversely to the direction of flight $\hat{v}_{Z1}(t)$ Estimated linear progression of the vertical speed $\hat{v}_{Z2}(t)$ Estimated quadratic progression of the vertical speed The basic progression of SAR processing is represented in the right portion of FIG. 1. For reasons of energy, the radar transmits frequency-modulated pulses with a quadratic phase history (so-called chirp signals) which, after reception, are correlated with a replica of this signal. In SAR this is identified as range compression or compression in the range direction (Block 1).

In the course of a subsequently performed movement compensation the following detailed steps are performed. A variation in the forward direction (in the X direction) results in an illuminated strip of terrain not being equidistantly scanned by the pulse repetition frequency (PRF) of the radar. During an overflight this can be compensated by an online readjustment of the pulse repetition frequency. Resampling, i.e. an interpolation and resampling of the raw radar data must be performed offline (Block 2).

A deviation in the slant range results, besides a phase error, also in an erroneous assignment of the backscattering signal to the corresponding range gates. This effect can be corrected by means of an additional temporal delay of the radar echo ahead of a phase correction (Block 3).

A radar backscattering signal S(t) can be described as follows:

$$S(t) = A_0 \cdot e^{j\phi(t)} \cdot e^{j\phi_{err}(t)}$$

In this case $A_0$ identifies the signal amplitude, $\phi(t)$ the nominal phase history and $\phi_{err}(t)$ the phase error caused by a deviation from the set flight path. To correct a phase error S(t), a multiplication with the conjugated complex phase error term $e^{-j\phi_{err}(t)}$ is performed (Block 5).

A backscattering signal is given an approximately quadratic phase history because of a change in the slant range during a fly-by of an illuminated target. Point target responses in the azimuth direction are obtained by the correlation of this backscattering signal with a function which can be calculated a priori and has the same phase history This is also called azimuth compression (Block 5). Blocks 10 to 60 assigned to the Blocks 1 to 5 will be individually explained below by means of FIGS. 2 to 7.

The device for determining the deviation of a platform in the Y- and Z-directions and for determining the forward speed (in the X-direction) described in patent application P 42 25 413.2 of Applicant is based on an integration of the acceleration values provided by an attitude and heading reference system. When processing these signals, the average value of the signal is formed before and after each integration and is subtracted. By means of this it is prevented that an offset of the acceleration signal, which is caused by errors of the sensor, causes a quadratic phase error in the motion compensation after two integrations.

Furthermore, by means of the above described integration method with subtraction of the offset, an accumulation of extremely large initial values is also prevented, such as can be created after an integration of a bias or over prolonged periods of time. Therefore, with digital signal processing there is now no longer a danger of a "memory overflow" because of a limited data word length or a limited memory space requirement.

However, the fact that a "natural" offset of the acceleration such as occurs, for example, in case of an extended curved flight, cannot be taken into consideration, must be accepted. Under normal flight conditions, however, this error can be neglected, so that it is possible to achieve a high-quality SAR image even with the method in accordance with patent application P 42 25 413.2. However, under the most stringent demands, in particular on the geometric fidelity of an SAR image, the above mentioned errors must be taken into account.

First, a suitable coordinate system within which the platform of the SAR system moves must be determined for the exact description of the motion errors. The curvature of the earth will not be considered in what follows in order to simplify the geometric conditions. The coordinate system used hereinafter is defined as follows:

The origin of the coordinate system is on the surface of the earth and marks the start of a strip of terrain represented.

The X-axis is located on the surface of the earth and points along the nominal flight path or the azimuth direction. Therefore the positive direction of the X-axis corresponds to the direction of flight.

The Y-axis is also located on the surface of the earth and is aligned perpendicularly in respect to the X-axis. The positive direction of the Y-axis points to the left, viewed in the direction of flight.

The Z-axis is placed perpendicularly on the X/Y plane and the positive direction of the Z-axis points upward.

It should furthermore be noted that in the course of the calculations which follow an average value will often be formed; for example, the average value of the time-dependent signal s(t) is indicated by $\overline{s(t)}$; in this case the following applies:

$$\overline{s(t)} = \frac{1}{T} \int_0^T s(t)\, dt; \tag{1}$$

The forward speed (in the X-direction) is determined in accordance with the method of patent application P 42 25 413.2 and as shown in Block 10 in FIG. 1 by an integration of the acceleration $a_X(t)$ in the direction of flight, and the offset is removed from the signals before and after the integration, which can be seen in the equations (2) and (3) below:

$$v_X''(t) = \int_0^t [a_X(t) - \overline{a_X(t)}]\, dt \tag{2}$$

$$v_X'(t) = v_X''(t) - \overline{v_X''(t)} \tag{3}$$

Figure 2:
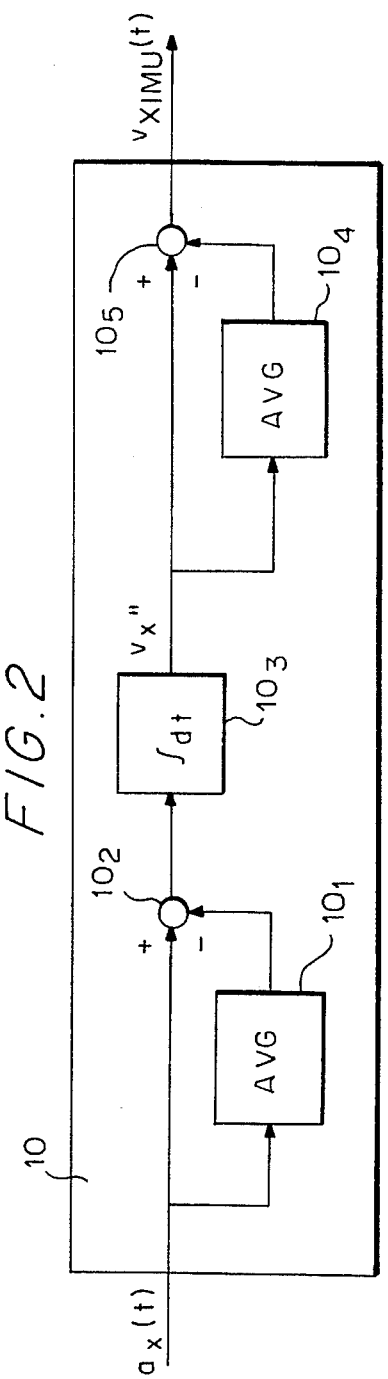
FIG. 2 is a schematic detailed block diagram of a device for calculating the forward speed in the direction of flight.

The forward speed is calculated in an integrator $10_3$ by means of a device 10 in FIG. 2 from the acceleration $a_X(t)$ in the direction of flight, in that before and after an integration of the acceleration $a_X(t)$ the offset $\overline{a_X(t)}$, which was generated in a first averaging unit $10_1$ or the offset $\overline{v''_X(t)}$, which was generated in a second averaging unit $10_4$, are removed in a first summing unit $10_2$ or a second summing unit $10_5$ from the directly applied signals $a_X(t)$ or $v''_X(t)$.

However, it is not possible to consider in the equations (2) and (3) the following speed progression error $v_{XERR}(t)$:

$$v_{XERR}(t) = a_{X0}t + v_{X0} \tag{4}$$

In this case $a_{X0}$ identifies the constant portion of the acceleration $a'_X(t)$ in the direction of flight, and $v_{X0}$ the average or constant speed in the direction of flight.

The forward speed $v_{XIMU}(t)$ calculated from the acceleration $a_X(t)$ (see output signal of the device 10 in FIG. 2) therefore is, taking into consideration an error $v_{XERR}(t)$:

$$v_{XIMU}(t) = v_X(t) - v_{XERR}(t) \tag{5}$$

Figure 3:
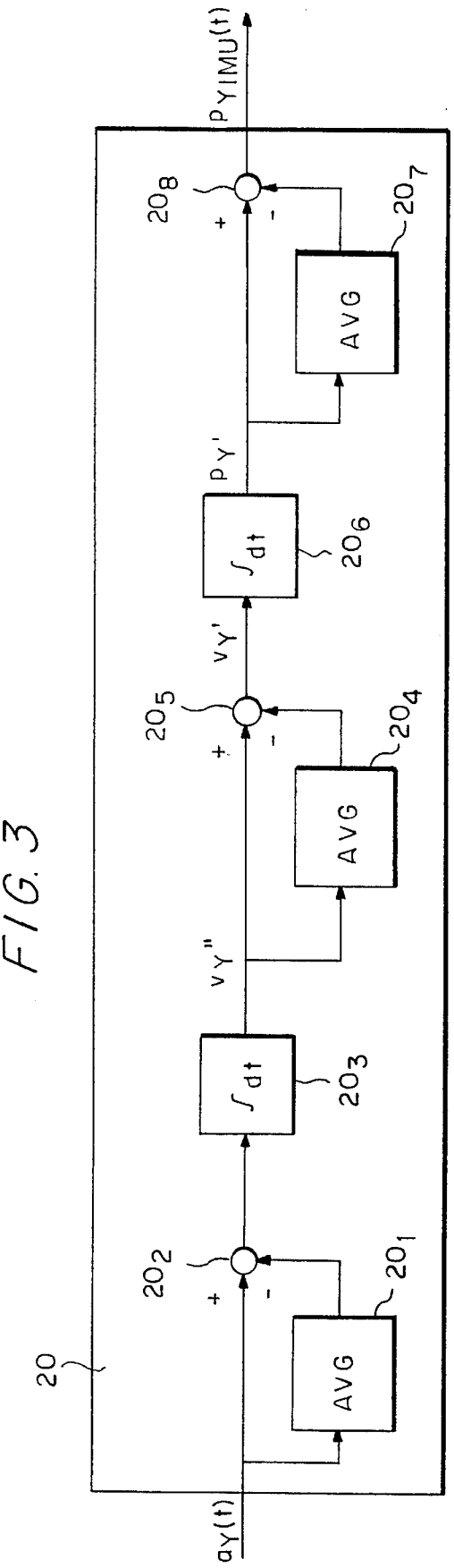
FIG. 3 is a schematic detailed block diagram of a device for calculating a lateral horizontal deviation.

A lateral horizontal deviation (in the Y-direction) is determined in the method described in patent application P 42 25 413.2 and as shown in detail in a Block 20 in FIG. 3, by the double integration of the acceleration $a_Y(t)$ transversely to the direction of flight, wherein the offset n is removed from the signal before and after each integration.

For this purpose and as shown in a device 20 in FIG. 3, an integration is performed twice in second and third integrators $20_3$ and $20_6$. Before and after each integration, the average value $\overline{a_Y(t)}$ of the signal $a_Y(t)$ or the average value $\overline{v''_Y(t)}$ of the signal $v'_Y(t)$ is formed in third and fourth averaging units $20_1$ and $20_4$ and is subtracted in respectively downstream disposed summing units $20_2$ or $20_5$ from the signals $a_Y(t)$ or $v''_Y(t)$ which are present there. After integration of the signal $v'_Y(t)$ in a fourth integrator $20_6$ and a subsequent subtraction of average value, formed in a fifth averaging unit $20_7$, in a fifth summing unit $20_8$ a lateral deviation $p_{YIMU}(t)$ of the slave system is obtained at the output of the latter, as can be seen from the following equations (6) to (9):

$$v_Y''(t) = \int_0^t [a_Y(t) - \overline{a_Y(t)}]\, dt \quad (6)$$

$$v_Y'(t) = v_Y''(t) - \overline{v_Y''(t)} \quad (7)$$

$$p_Y''(t) = \int_0^t [v_Y'(t) - \overline{v_Y'(t)}]\, dt \quad (8)$$

$$p_{Y_{IMU}}(t) = p_Y''(t) - \overline{p_Y''(t)} \quad (9)$$

Thus is is not possible to detect the following progression $p_{YERR}(t)$ of the flight path (or the error $p_{YERR}(t)$ of the lateral deviation) in the course of calculating the deviation in the Y-direction:

$$p_{Y_{ERR}}(t) = \frac{a_{Y_0}}{2} t^2 + v_{Y_0} t + p_{Y_0} \quad (10)$$

In this case, $a_{Y0}$ identifies the constant portion of the acceleration $a_Y(t)$ transversely to the direction of flight, $v_{X0}$ the average or constant speed in the direction of flight and $p_{Y0}$ a constant lateral deviation from the flight path, i.e. parallel to the direction of flight.

The lateral deviation $p_{YIMU}(t)$ calculated from the acceleration $a_Y(t)$, taking into consideration the error $p_{YERR}(t)$, is:

$$p_{YIMU}(t) = p_Y(t) - p_{YERR}(t) \quad (11)$$

A vertical deviation (in the Z-direction) is determined in the method in accordance with patent application P 42 25 413.2, as shown in detail in Block 30 in FIG. 4, by a double integration of the vertical acceleration $a_Z(t)$ in accordance with equations (12) to (15) represented below:

$$v_Z''(t) = \int_0^t [a_Z(t) - \overline{a_Z(t)}]\, dt \quad (12)$$

$$v_Z'(t) = v_Z''(t) - \overline{v_Z''(t)} \quad (13)$$

$$p_Z(t) = \int_0^t [v_Z'(t) - \overline{v_Z'(t)}]\, dt \quad (14)$$

$$p_{Z_{IMU}}(t) = p_Z'(t) - \overline{p_Z'(t)} \quad (15)$$

In this case, prior to the first integration of the vertical acceleration $a_Z(t)$ in a fourth integrator $30_3$, the average value $\overline{a_Z(t)}$ of the signal $a_Z(t)$ generated in a sixth averaging unit $30_1$ is subtracted in a sixth summing unit $30_2$ from the acceleration signal $a_Z(t)$. Furthermore, following integration by means of the fourth integrator $30_3$, the average value $\overline{v''_Z(t)}$ generated by a seventh averaging unit $30_4$ is subtracted from the integrator output signal $v''_Z(t)$ in a downstream seventh summing unit $30_5$. Also, the average value $\overline{p'_Z(t)}$ generated by an eighth averaging unit $30_7$ is subtracted from integrator output signal $p'_Z(t)$ in an eighth summing unit $30_8$ downstream of the fifth integrator $30_6$. A signal $p_{ZIMU}(t)$, which corresponds to the flight level of the slave system (IMU), is the obtained at the output of the eighth summing unit $30_8$.

Thus is is not possible to detect the following progression $p_{ZERR}(t)$ of the flight path in the course of calculating the deviation in the Z-direction:

$$p_{Z_{ERR}}(t) = \frac{a_{Z_0}}{2} t^2 + v_{Z_0} t + p_{Z_0} \quad (16)$$

In this case, $a_{Z0}$ identifies the constant portion of the vertical acceleration $a_Z(t)$, $v_{Z0}$ the average vertical speed and $p_{Z0}$ the average flight level above the ground. The lateral deviation calculated from the vertical acceleration $a_Z(t)$, taking into consideration the error $p_{ZERR}(t)$, is:

$$p_{ZIMU} = p_Z(t) - p_{ZERR}(t) \quad (17)$$

To compensate the errors $v_{XERR}(t)$, $p_{YERR}(l)$ or $p_{ZERR}(l)$, the coefficients of the polynomials in equations (4), (10) and (16) are determined by means of an additional navigation system and the method of the invention for processing navigational data.

As can be seen from Block 40 in FIG. 5, a correction of the forward speed is made by forming a difference between the speed $v_{XIMU}$ in the direction of flight, determined by the slave system (IMU) and the forward speed $v_{XAUX}(t)$ of a speed sensor not containing the error $v_{XERR}(t)$, measured by a master system.

As a result the erroneous forward speed $v_{XERR}(t)$ is obtained, which in addition contains a noise signal, as can be seen from the following equation:

$$v_{XAUX}(t) - v_{XIMU}(t) = v_{XERR}(t) + v_{XN}(t) \quad (18)$$

By means of the least squares fit method it is possible to estimate the coefficients of the polynomial $v_{XERR}(t)$ (see equation (4)) and use them for determining a correction polynomial $v_{XFIT}(t)$; the following is true for the correction polynomial:

$$v_{X_{FIT}}(t) = \int_0^t \hat{a}_{X_0}\, dt + \hat{v}_{X_0} = \quad (19)$$

$$= \hat{a}_{X_0} t + \hat{v}_{X_0} \quad (20)$$

In this case, $\hat{a}_{X0}$ and $\hat{v}_{X0}$ indicate the estimated average acceleration and the speed in the X-direction.

As can be seen from the block diagram in FIG. 5, in a ninth summing unit $40_1$ the forward speed $v_{XIMU}(t)$ measured by the slave system (IMU) is subtracted from the forward speed $v_{XAUX}(t)$ measured by the master system and as a result the signal Delta $v_X(t)$ is obtained at the output of the summing unit $40_1$, which is supplied to a coefficient estimating unit $40_2$. By means of the least squares fit method the estimated average acceleration $\hat{a}_{X0}$ or the estimated average speed $\hat{v}_{X0}$ in the X-direction are obtained as output signals at the unit $40_2$. Following an integration in a sixth integrator $40_3$ of the signal $\hat{a}_{X0}$, which corresponds to the estimated average acceleration, the signal corresponding to the estimated average speed $\hat{v}_{X1}$ is obtained at the integrator output. The signal $\hat{v}_{X1}$ and the signal obtained at the output of the estimating unit and corresponding to the average estimated forward speed $\hat{v}_{X0}$ are added in a tenth summing unit $40_4$, so that a term $v_{XFIT}(l)$ for correction of the forward speed is obtained at its output.

In accordance with the following equation (21), a correction speed progression $v_{XKORR}(t)$ is obtained by an addition of the term $v_{XFIT}(l)$ to the signal $v_{XIMU}(t)$ corresponding to the forward speed of the slave system in an eleventh summing unit $40_5$ the device 40 of FIG. 5:

$$v_{XKORR}(t) = v_{XIMU}(t) + v_{XFIT}(t) \quad (21)$$

In contrast to this, in the method in accordance with patent application 42 25 413.2 it was only possible to make available the estimated average forward speed $v_{X0}(t)$.

Figure 6:
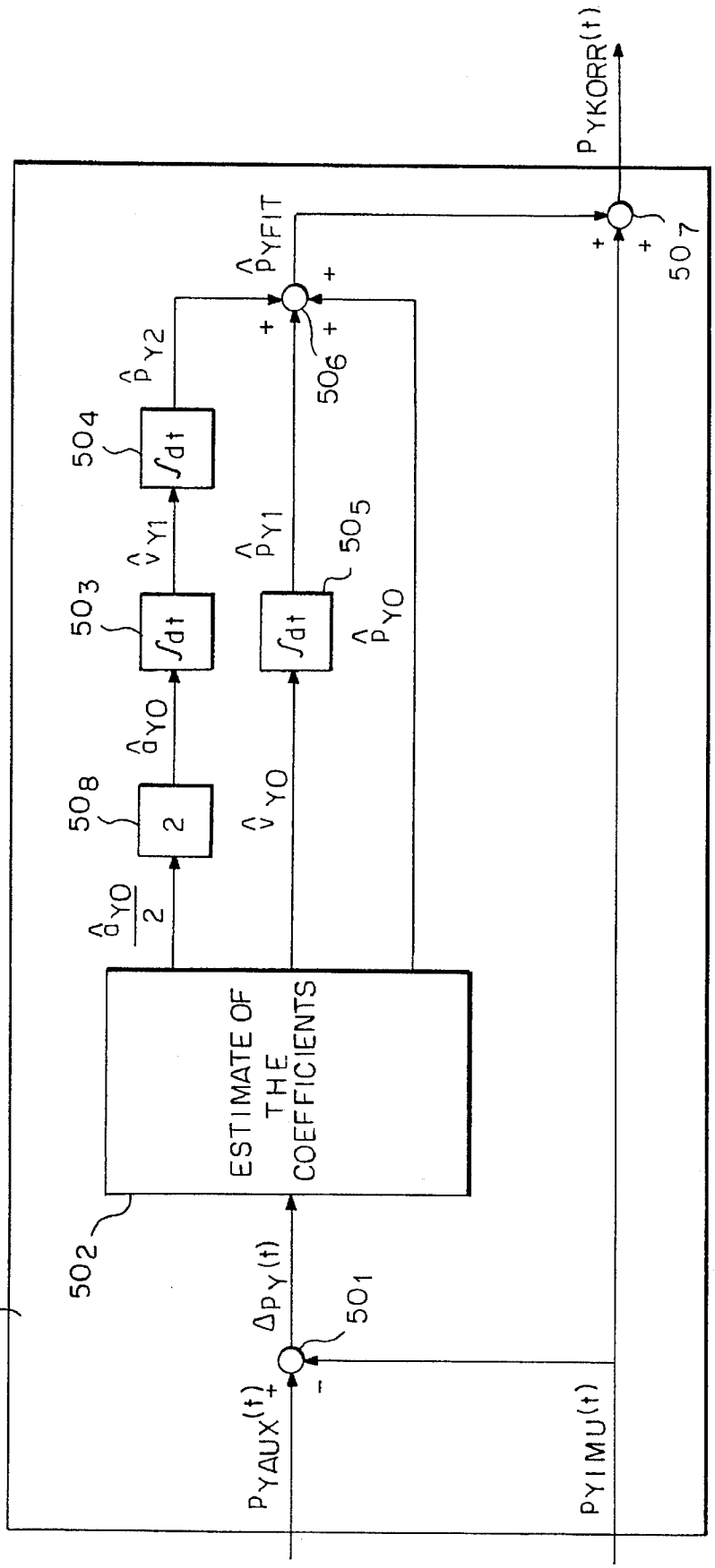
FIG. 6 is a detailed block diagram of a device augmenting the IMU position in the Y-direction by means of an additional position measurement.

As illustrated in Block 50 of FIG. 6, a correction of the lateral deviation was performed by forming the difference between the deviation $p_{YIMU}(t)$ of the slave system and the deviation $p_{YAUX}$ of a navigation system employed as a master system, which does not contain the error $p_{YERR}(t)$. As can be seen from the equation (22) represented below, the deviation progression, or the error $p_{YERR}(t)$ of the lateral deviation, is obtained as a result, which contains a noise signal $p_{YN}(t)$:

$$p_{YAUX}(t) - p_{YIMU}(t) = p_{YERR}(t) + p_{YN}(t) \quad (22)$$

As can be seen from FIG. 6, in a twelfth summing unit $50_1$ of the device 50 the lateral deviation $p_{YIMU}(t)$ of the slave system is subtracted from the lateral deviation $p_{YAUX}(t)$ measured by a master system for a correction of the lateral deviation. The output signal Delta $p_Y(t)$ of the summing unit $50_1$ is supplied to a downstream second coefficient estimating unit $50_2$, in which in accordance with the least squares fit method the coefficients of the polynomial indicated in the equation (10) are estimated and are employed for the determination of a correction polynomial $p_{YFIT}(t)$ in accordance with the equation (23) reproduced below. It is therefore true that $$p_{Y_{FIT}}(t) = \int_0^t \int_0^t \hat{a}_{Y_0} dt^2 + \int_0^t \hat{v}_{Y_0} dt + \hat{p}_{Y_0} = \quad (23)$$

$$= \frac{\hat{a}_{Y_0}}{2} t^2 + \hat{v}_{Y_0} t + \hat{p}_{Y_0}. \quad (24)$$

In the equations (23) and (24), $\hat{a}_{Y0}$, $\hat{v}_{Y0}$ and $\hat{p}_{Y0}$ identify the estimated average acceleration, the average speed and the estimated average deviation in the Y-direction. The estimated average acceleration $\hat{a}_{Y0}/2$, which represents an output signal of the estimating unit $50_2$, is multiplied by 2 in a downstream multiplication unit $40_8$ and supplied to a seventh integrator $50_3$. The integrator output signal $\hat{v}_{Y1}$ is supplied to an eighth integrator $50_4$ and its output signal $\hat{p}_{Y2}$ is supplied to a thirteenth summing unit $50_6$. An output signal $\hat{v}_{Y0}$ of the estimating unit $50_2$, which corresponds to the estimated average speed, is supplied to a ninth integrator $50_5$, whose output signal $\hat{p}_{Y1}$ is supplied as a further input signal to the summing unit $50_6$, to whose third input an output signal $\hat{p}_{Y0}$ corresponding to the average estimated deviation in the Y-direction is supplied. An output signal $p_{YFIT}(t)$ corresponding to equation (24) is added to the lateral deviation $p_{YIMU}(t)$ of the slave system so that, in accordance with the equation (25) reproduced below:

$$p_{YKORR}(t) = p_{YIMU}(t) + p_{YFIT}(t) \quad (25)$$

the corrected progression of the lateral deviation $p_{YKORR}(t)$ now results at the output of the summing unit $50_7$. (In contrast thereto, a complete or even partial correction of an error in the lateral deviation $p_{YERR}(t)$ was not possible with the method in accordance with patent application P 42 25 413.2).

Figure 7:
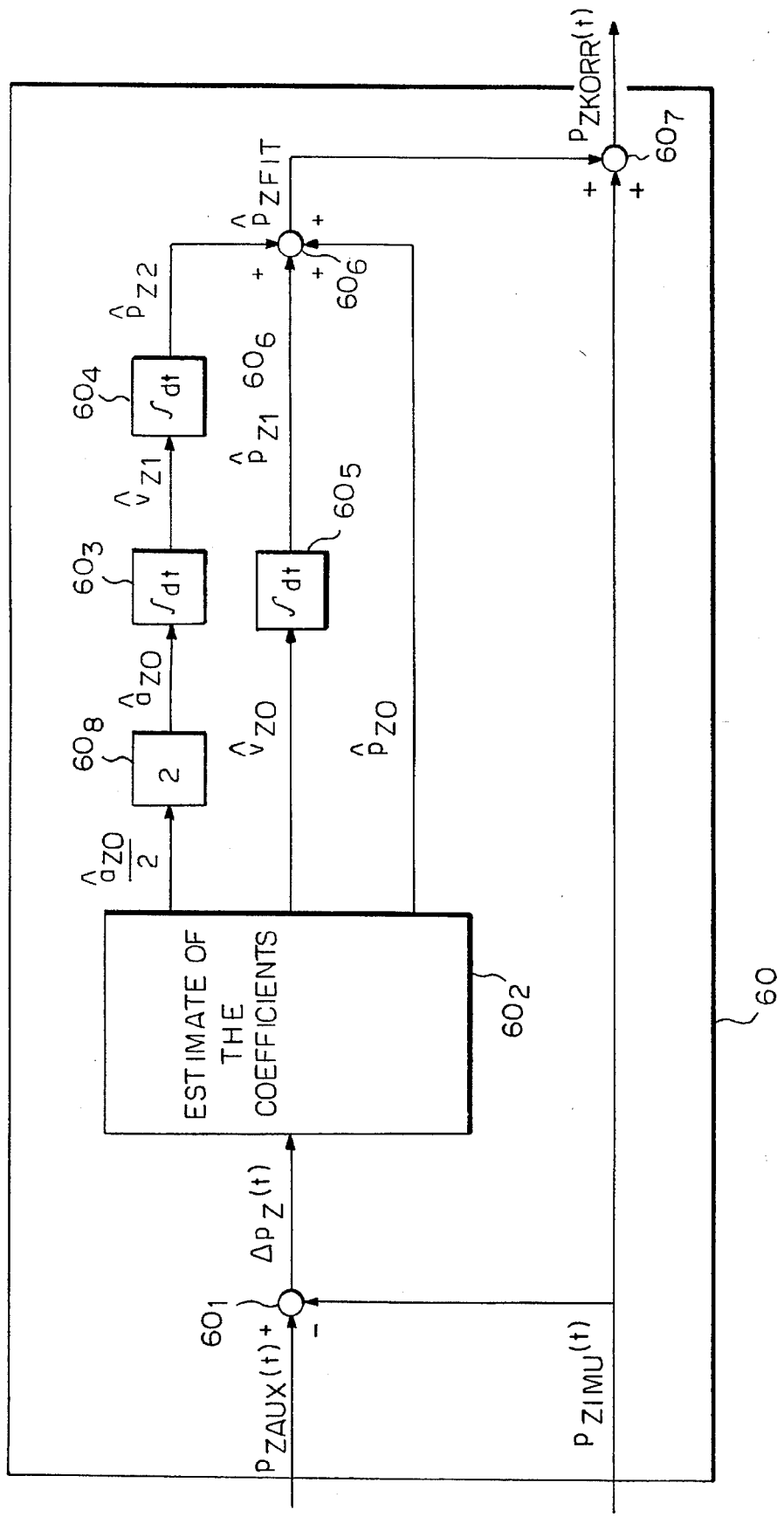
FIG. 7 is a schematic detailed block diagram of a device augmenting the IMU position in the Z-direction by means of an additional altitude measurement.

A correction of the vertical deviation, such as can be found in FIGS. 6 and 7, is provided by forming a difference between the lateral deviation $p_{ZIMU}$ of the slave system (IMU) and a deviation $p_{ZAUX}$, detected by means of a navigation system or an altimeter and not containing the error $p_{ZERR}(t)$.

In accordance with the following equation (26):

$$p_{ZAUX}(t) - p_{ZIMU}(t) = p_{ZERR}(t) + p_{ZN}(t) \quad (26)$$

an altitude progression $p_{ZERR}(t)$ or the error in the flight level above the ground is obtained as the result, wherein this signal still contains a noise signal $p_{Zn}(t)$.

By means of the least squares fit method the coefficients of the polynomial indicated in equation (16) are estimated and used for determining a correction polynomial $p_{XFIT}(t)$ in accordance with the equations (27) and (28) reproduced below:

$$p_{Z_{FIT}}(t) = \int_0^t \int_0^t \hat{a}_{Z_0} dt^2 + \int_0^t \hat{v}_{Z_0} dt + \hat{p}_{Z_0} = \quad (27)$$

$$= \frac{\hat{a}_{Z_0}}{2} t^2 + \hat{v}_{Z_0} t + \hat{p}_{Z_0} \quad (28)$$

In the equations (27) and (28), $\hat{a}_{Z0}$, $\hat{v}_{Z0}$ and $\hat{p}_{Z0}$ indicate the estimated average acceleration, the estimated average speed and the estimated average deviation in the Z-direction. Finally, by adding the term $p_{ZFIT}(t)$ for correcting the flight level above the ground and the deviation $p_{ZIMU}(t)$, a corrected altitude progression $p_{ZKORR}(t)$ results in accordance with the following equation (29):

$$p_{ZKORR}(t) = p_{ZIMU}(t) + p_{ZFIT}(t) \quad (29)$$

(With the method in accordance with patent application P 42 25 413.2 it has so far been only possible to provide the estimated average flight level $p_{Z0}$ above the ground).

Since the device 60 represented in FIG. 7 corresponds in its design and function to the device 50 represented in FIG. 6, reference is made to the remarks in connection with the devices represented in FIG. 6 in regard to a realization of the equations (26) to (29) for obtaining the corrected altitude progression $p_{ZKORR}(t)$ at the output of the device 60, since the units indicated by reference numerals 50 and 60 and with the same subscripts are analogous in design and function or operate analogously.

The equations (26) to (29), which can be realized by means of the device 60 shown in FIG. 7, are illustrated in the form of schematically represented graphs in FIGS. 8a and 8b. In the process, the flight level determined by means of an inertial system (IMU) is subtracted from the flight level determined by means of a GPS system is a summing unit $S_1$. The output signal of the summing unit $S_1$ can then be schematically represented as shown in the central right portion of FIG. 8a. In this case, in addition to the difference of the flight levels determined by means of the GPS and the IMU systems, the FIT polynomial, determined by least squares fit method, has also been indicated by dash-dotted lines.

In a block downstream of the difference diagram, the FIT-polynomials $p_{XKORR}(t)$, $p_{YKORR}$ and $p_{ZKORR}$ are generated at the outputs of the devices 40, 50 and 60, besides an estimate of the coefficients as performed in the units $40_2$, $50_2$ and $60_2$ of the devices 40, 50 and 60. The correction term obtained by this is illustrated by the subsequent graph. The correction term obtained is then added to the flight level obtained by means of the IMU system in a further summing unit $S_2$, which then results in the graph represented at bottom right of FIG. 7b.

To make the improvement obtained by means of the invention clear, the flight level obtained by means of the GPS system has also been indicated by dotted lines in addition to the corrected flight level shown in solid lines, by means of which the improvement regarding the flight level achieved with the method of the invention is graphically explained.

Further possibilities of employment of the method of the invention in the form of a support of the outputs of a attitude and heading reference system by means of additional navigation systems are provided by Lidar and Sonar systems. The method in accordance with the invention can generally always be used where navigational data of low bandwidth are to be combined with acceleration values of an inertial measuring unit in order to obtain an increase in the accuracy of a position to be measured in this way.

I claim:

1. A method for determining the position of an aircraft for radar mapping, comprising:

providing a processor in the airplane;

providing a master navigation system coupled to the processor and including an aircraft speedometer for measuring a forward x-speed $v_{XUAX}(t)$, a lateral horizontal position sensor for measuring a lateral y-position $p_{YUAX}(t)$, and an altimeter for measuring a vertical z-position $p_{ZUAX}(t)$;

providing a slave system including an inertial measurement unit coupled to the processor and further including an x-accelerometer for generating a forward-direction horizontal acceleration signal $a_x(t)$, a y-accelerometer for generating a lateral horizontal acceleration signal $a_y(t)$, and a z-accelerometer for generating a vertical acceleration signal $a_z(t)$;

(a) inputting the forward-direction acceleration signal $a_x(t)$ from the inertial system to the processor;

time-averaging over a time interval T the acceleration signal $a_x(t)$ to obtain a first x-adjustment $\overline{a_x(t)}$;

subtracting the first x-adjustment $\overline{a_x(t)}$ from the acceleration signal $a_x(t)$ to obtain an adjusted acceleration signal $a'_x(t)$;

integrating the adjusted acceleration signal $a'_x(t)$ over the interval T to obtain a velocity $v''_x(t)$ according to $$v''_X(t) = \int_0^t [a_X(t) - \overline{a_X(t)}]dt \quad (2)$$

time-averaging the velocity $v''_x(t)$ over the interval T to obtain a $v_x$-adjustment $\overline{v_x(t)}$;

subtracting the $v_x$-adjustment $\overline{v_x(t)}$ from the velocity $v''_x(t)$ to obtain a forward airplane speed $v_{XIMU}(t)$ in the desired flight direction according to $$v_{XIMU}(t) = v_x(t) - v''_x(t) \quad (5)$$

estimating by method of least squares, from a difference between the speed $v_{XIMU}(t)$ and the speed measurement of the speedometer, an average acceleration $\hat{a}_{X0}$ and an average speed $\hat{v}_{X0}$;

creating a correction term $v_{XFIT}(t)$ from a sum of the average speed $\hat{v}_{X0}$ and a time integration of $\hat{a}_{X0}$ according to $$v_{X_{FIT}}(t) = \int_0^t \hat{a}_{X_0} dt + v_{X_0} = \quad (19)$$

$$= \hat{a}_{X_0} t + v_{X_0} \quad (20)$$

correcting the speed $v_{XIMU}(t)$ in the desired flight direction by adding the correction term $v_{XFIT}(t)$ thereto to obtain a corrected flight speed $v_{XKORR}(t)$ according to $$v_{XKORR}(t) = v_{XIMU}(t) + v_{XFIT}(t)$$

(b) inputting the lateral-direction acceleration signal $a_y(t)$ from the inertial system to the processor;

time-averaging over a time interval T the acceleration signal $a_y(t)$ to obtain a first y-adjustment $\overline{a_y(t)}$;

subtracting the first y-adjustment $\overline{a_y(t)}$ from the acceleration signal $a_y(t)$ to obtain an adjusted acceleration signal $a'_y(t)$;

integrating the adjusted acceleration signal $a'_y(t)$ over the interval T to obtain a velocity $v''_y(t)$ according to $$v''_Y(t) = \int_0^t [a_Y(t) - \overline{a_Y(t)}]dt \quad (6)$$

time-averaging the velocity $v''_y(t)$ over the interval T to obtain a $v_y$-adjustment $\overline{v_y(t)}$;

subtracting the first y-adjustment $\overline{v_y(t)}$ from the velocity $v''_y(t)$ to obtain an adjusted velocity signal $v'_y(t)$;

integrating the adjusted velocity signal $v'_y(t)$ over the interval T to obtain a position $p_y'(t)$ according to $$p'_Y(t) = \int_0^t [v'_Y(t) - \overline{v'_Y(t)}]dt \quad (8)$$

time-averaging the position $p'_y(t)$ over the interval T to obtain a $p_y$-adjustment $\overline{p_y(t)}$;

subtracting the $p_y$-adjustment $\overline{p_y(t)}$ from the velocity $p'_y(t)$ to obtain a forward airplane speed $p_{YIMU}(t)$ in the desired flight direction according to $$p_{YIMU}(t) = p'_Y(t) - \overline{p'_Y(t)} \quad (9)$$

estimating by method of least squares, from a difference between the speed $p_{YIMU}(t)$ and the speed measurement of the speedometer, an average acceleration $\hat{a}_{Y0}$ and an average speed $\hat{v}_{Y0}$;

creating a correction term $p_{YFIT}(t)$ from a sum of the average speed $\hat{v}_{Y0}$ and a time integration of $\hat{a}_{Y0}$ according to $$p_{Y_{FIT}}(t) = \int_0^t \int_0^t \hat{a}_{Y_0} dt^2 + \int_0^t \hat{v}_{Y_0} dt + \hat{p}_{Y_0} =$$

$$= \frac{\hat{a}_{Y_0}}{2} t^2 + \hat{v}_{Y_0} t + \hat{p}_{Y_0}$$

correcting the speed $p_{YIMU}(t)$ in the desired flight direction by adding the correction term $p_{YFIT}(t)$ thereto to obtain a corrected flight speed $p_{YKORR}(t)$ according to $$p_{YKORR}(t) = p_{YIMU}(t) + p_{YFIT}(t)$$

correcting the motion of the aircraft along the desired flight path according to the value of $p_{YKORR}(t)$;

(c) inputting the lateral-direction acceleration signal $a_z(t)$ from the inertial system to the processor;

time-averaging over a time interval T the acceleration signal $a_z(t)$ to obtain a first z-adjustment $\overline{a_z(t)}$;

subtracting the first z-adjustment $\overline{a_z(t)}$ from the acceleration signal $a_z(t)$ to obtain an adjusted acceleration signal $a'_z(t)$;

integrating the adjusted acceleration signal $a'_z(t)$ over the interval T to obtain a velocity $v''_z(t)$ according to $$v''_z(t) = \int_0^t [a_z(t) - \overline{a_z(t)}] dt \qquad (12)$$

time-averaging the velocity $v''_z(t)$ over the interval T to obtain a $v_z$-adjustment $\overline{v_z(t)}$;

subtracting the first z-adjustment $\overline{v_z(t)}$ from the velocity $v_z(t)$ to obtain an adjusted velocity signal $v'_z(t)$;

integrating the adjusted velocity signal $v'_z(t)$ over the interval T to obtain a position $p'_z(t)$ according to $$p'_z(t) = \int_0^t [v'_z(t) - \overline{v'_z(t)}] dt \qquad (14)$$

time-averaging the position $p'_z(t)$ over the interval T to obtain a $p_z$-adjustment $\overline{p_z(t)}$;

subtracting the $p_z$-adjustment $\overline{p_z(t)}$ from the velocity $p''_z(t)$ to obtain a forward airplane speed $p_{ZIMU}(t)$ in the desired flight direction according to $$p_{ZIMU}(t) = p'_z(t) - \overline{p'_z(t)} \qquad (15)$$

estimating by method of least squares, from a difference between the speed $p_{ZIMU}(t)$ and the speed measurement of the speedometer, an average acceleration $\hat{a}_{z0}$ and an average speed $\hat{v}_{z0}$;

creating a correction term $p_{ZFIT}(t)$ from a sum of the average speed $\hat{v}_{z0}$ and a time integration of $\hat{a}_{z0}$ according to $$pz_{FIT}(t) = \int_0^t \int_0^t \hat{a}_{z_0} dt^2 + \int_0^t \hat{v}_{z_0} dt + \hat{p}z_0 = \qquad (27)$$

$$= \frac{\hat{a}_{z_0}}{2} t^2 + \hat{v}_{z_0} t + \hat{p}_{z_0} \qquad (28)$$

correcting the speed $p_{ZIMU}(t)$ in the desired flight direction by adding the correction term $p_{ZFIT}(t)$ thereto to obtain a corrected flight speed $p_{ZKORR}(t)$ according to $$p_{ZKORR}(t) = p_{ZIMU}(t) + p_{ZFIT}(t) \qquad (29)$$

and compensating the radar mapping according to the values of $v_{XKORR}(t)$, $p_{YKORR}(t)$, and $p_{ZKORR}(t)$.

2. The method according to claim 1, wherein time averaging is according to $$\overline{s(t)} = \frac{1}{T} \int_0^T s(t) dt.$$

3. A device for determining the position of an aircraft for radar mapping, comprising:

a processor in the airplane;

a master navigation system coupled to the processor and including an aircraft speedometer for measuring a forward x-speed $v_{XUAX}(t)$, a lateral horizontal position sensor for measuring a lateral y-position $p_{YUAX}(t)$, and an altimeter for measuring a vertical z-position $p_{ZUAX}(t)$;

a slave system including an inertial measurement unit coupled to the processor and further including an x-accelerometer for generating a forward-direction horizontal acceleration signal $a_x(t)$, a y-accelerometer for generating a lateral horizontal acceleration signal $a_y(t)$, and a z-accelerometer for generating a vertical acceleration signal $a_x(t)$;

(a) means for inputting the forward-direction acceleration signal $a_x(t)$ from the inertial system to the processor;

means for time-averaging over a time interval T the acceleration signal $a_x(t)$ to obtain a first x-adjustment $\overline{a_x(t)}$;

means for subtracting the first x-adjustment $\overline{a_x(t)}$ from the acceleration signal $a_x(t)$ to obtain an adjusted acceleration signal $a'_x(t)$;

means for integrating the adjusted acceleration signal $a'_x(t)$ over the interval T to obtain a velocity $v_x''(t)$ according to $$v_x''(t) = \int_0^t [a_X(t) - \overline{a_X(t)}] dt \qquad (2)$$

means for time-averaging the velocity $v''_x(t)$ over the interval T to obtain a $v_x$-adjustment $\overline{v_x(t)}$;

means for subtracting the $v_x$-adjustment $\overline{v_x(t)}$ from the velocity $v''_x(t)$ to obtain a forward airplane speed $v_{XIMU}(t)$ in the desired flight direction according to $$v_{XIMU}(t) = v_x(t) - v''_x(t) \qquad (5)$$

means for estimating by method of least squares, from a difference between the speed $v_{XIMU}(t)$ and the speed measurement of the speedometer, an average acceleration $\hat{a}_{x0}$ and an average speed $\hat{v}_{x0}$;

means for creating a correction term $v_{XFIT}(t)$ from a sum of the average speed $\hat{v}_{x0}$ and a time integration of $\hat{a}_{x0}$ according to $$v_{X_{FIT}}(t) = \int_0^t \hat{a}_{x_0} dt + \hat{v}_{x_0} =$$

$$= \hat{a}_{x_0} t + \hat{v}_{x_0}$$

means for correcting the speed $v_{XIMU}(t)$ in the desired flight direction by adding the correction term $v_{XFIT}(t)$ thereto to obtain a corrected flight speed $v_{XKORR}(t)$ according to $$v_{XKORR}(t) = v_{XIMU}(t) + v_{XFIT}(t)$$

(b) means for inputting the lateral-direction acceleration signal $a_y(t)$ from the inertial system to the processor;

means for time-averaging over a time interval T the acceleration signal $a_y(t)$ to obtain a first y-adjustment $\overline{a_y(t)}$;

means for subtracting the first y-adjustment $\overline{a_y(t)}$ from the acceleration signal $a_y(t)$ to obtain an adjusted acceleration signal $a'_y(t)$;

means for integrating the adjusted acceleration signal $a'_y(t)$ over the interval T to obtain a velocity $v_y''(t)$ according to $$v_Y''(t) = \int_0^t [a_Y(t) - \overline{a_Y(t)}] dt$$

means for time-averaging the velocity $v''_y(t)$ over the interval T to obtain a $v_y$-adjustment $\overline{v_y(t)}$;

means for subtracting the first y-adjustment $\overline{v_y(t)}$ from the velocity $v_y(t)$ to obtain an adjusted velocity signal $v'_y(t)$;

means for integrating the adjusted velocity signal $v'_y(t)$ over the interval T to obtain a position $p_y'(t)$ according to $$p_{Y}'(t) = \int_0^t [v_Y'(t) - \overline{v_Y'(t)}] \, dt$$

means for time-averaging the position $p'_y(t)$ over the interval T to obtain a $p_y$-adjustment $p_y(t)$;

means for subtracting the $p_y$-adjustment $p_y(t)$ from the velocity $p'_y(t)$ to obtain a forward airplane speed $p_{YIMU}(t)$ in the desired flight direction according to $$p_{YIMU}(t) = p'_Y(t) - \overline{p'_Y(t)}$$

means for estimating by method of least squares, from a difference between the speed $p_{YIMU}(t)$ and the speed measurement of the speedometer, an average acceleration $\hat{a}_{Y0}$ and an average speed $\hat{v}_{Y0}$;

means for creating a correction term $p_{YFIT}(t)$ from a sum of the average speed $\hat{v}_{Y0}$ and a time integration of $\hat{a}_{Y0}$ according to $$p_{Y_{FIT}}(t) = \int_0^t \int_0^t \hat{a}_{Y_0} \, dt^2 + \int_0^t \hat{v}_{Y_0} \, dt + \hat{p}_{Y_0} =$$

$$= \frac{\hat{a}_{Y_0}}{2} t^2 + \hat{v}_{Y_0} t + \hat{p}_{Y_0}$$

means for correcting the speed $p_{YIMU}(t)$ in the desired flight direction by adding the correction term $p_{YFIT}(t)$ thereto to obtain a corrected flight speed $p_{YKORR}(t)$ according to $$p_{YKORR}(t) = p_{YIMU}(t) + p_{YFIT}(t)$$

means for correcting the motion of the aircraft along the desired flight path according to the value of $p_{YKORR}(t)$;

(c) means for inputting the lateral-direction acceleration signal $a_z(t)$ from the inertial system to the processor;

means for time-averaging over a time interval T the acceleration signal $a_z(t)$ to obtain a first z-adjustment $a_z(t)$;

means for subtracting the first z-adjustment $a_z(t)$ from the acceleration signal $a_z(t)$ to obtain an adjusted acceleration signal $a'_z(t)$;

means for integrating the adjusted acceleration signal $a'_z(t)$ over the interval T to obtain a velocity $v_z''(t)$ according to $$v_Z''(t) = \int_0^t [a_Z(t) - \overline{a_Z(t)}] \, dt$$

means for time-averaging the velocity $v''_z(t)$ over the interval T to obtain a $v_z$-adjustment $v_z(t)$;

means for subtracting the first z-adjustment $v_z(t)$ from the velocity $v_z(t)$ to obtain an adjusted velocity signal $v'_z(t)$;

means for integrating the adjusted velocity signal $v'_z(t)$ over the interval T to obtain a position $p_z'(t)$ according to $$p_{Z}'(t) = \int_0^t [v_Z'(t) - \overline{v_Z'(t)}] \, dt$$

means for time-averaging the position $p'_z(t)$ over the interval T to obtain a $p_z$-adjustment $p_z(t)$;

means for subtracting the $p_z$-adjustment $p_z(t)$ from the velocity $p'_z(t)$ to obtain a forward airplane speed $p_{ZIMU}(t)$ in the desired flight direction according to $$p_{ZIMU}(t) = p'_Z(t) - \overline{p'_Z(t)}$$

means for estimating by method of least squares, from a difference between the speed $p_{ZIMU}(t)$ and the speed measurement of the speedometer, an average acceleration $\hat{a}_{Z0}$ and an average speed $\hat{v}_{Z0}$;

means for creating a correction term $p_{ZFIT}(t)$ from a sum of the average speed $\hat{v}_{Z0}$ and a time integration of $\hat{a}_{Z0}$ according to $$p_{Z_{FIT}}(t) = \int_0^t \int_0^t \hat{a}_{Z_0} \, dt^2 + \int_0^t \hat{v}_{Z_0} \, dt + \hat{p}_{Z_0} =$$

$$= \frac{\hat{a}_{Z_0}}{2} t^2 + \hat{v}_{Z_0} t + \hat{p}_{Z_0}$$

means for correcting the speed $p_{ZIMU}(t)$ in the desired flight direction by adding the correction term $p_{ZFIT}(t)$ thereto to obtain a corrected flight speed $p_{ZKORR}(t)$ according to $$p_{ZKORR}(t) = p_{ZIMU}(t) + p_{ZFIT}(t)$$

and means for compensating the radar mapping according to the values of $v_{XKORR}(t)$, $p_{YKORR}(t)$, and $p_{ZKORR}(t)$.

4. The method according to claim 3, wherein time averaging is according to $$\overline{s(t)} = \frac{1}{T} \int_0^T s(t) \, dt.$$

* * * * *